United States Patent Office 3,230,258
Patented Jan. 18, 1966

3,230,258
PROCESS FOR THE PRODUCTION OF 3-ALKYL-6-HALOGENO-ANILINES
Herbert Oelschläger, Privatdozent, Hamburg-Billstedt, Germany, assignor to Chemische Fabrik Promonta Gesellschaft mit beschränkter Haftung, Hamburg, Germany
No Drawing. Filed June 9, 1961, Ser. No. 116,661
Claims priority, application Germany, June 10, 1960, C 21,645
5 Claims. (Cl. 260—578)

This invention relates to a process for the production of 3-alkyl-6-halogeno-anilines.

3-alkyl-6-halogeno-anilines are suitable starting materials for the synthesis of therapeutically important compounds, for example anti-malarial or anaesthetising compounds. These aniline derivatives are also of interest for the production of commercially important products, for example dyestuffs or tanning agents. Furthermore, they themselves show specific natural effects, for example of insecticidal or tuberculostatic nature.

Processes for the production of 3-alkyl-6-halogeno-anilines have not so far been described in the literature, with the exception of 3-ethyl-6-bromo-aniline, which was obtained in a complicated manner by H. Kondo and S. Uyeo (Ber. dtsch. chem. Ges. 70, 1094 (1937) as follows:

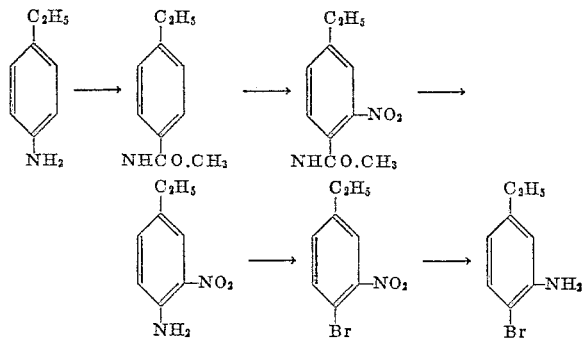

The yield with the conversion of 3-nitro-4-aminoethyl benzene into 3-nitro-4-bromethylbenzene (Sandmeyer reaction) is comparatively low. This method is found to be even more unfavourable when the starting material, for example having a relatively long alkyl chain, can only be obtained with difficulty. In addition, it is impossible to obtain 3-alkyl-6-fluoroanilines according to Kondo and Uyeo.

It has now been found that 3-alkyl-6-halogeno-anilines can be conveniently produced with good yields, starting from 4-halophenyl-alkyl ketones, according to the following reaction scheme:

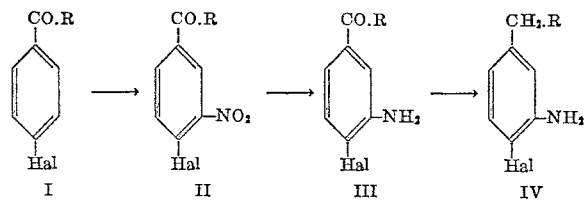

In these formulae, R represents an alkyl group with from 1 to 9 carbon atoms and Hal is fluorine, chlorine, bromine or iodine.

The ketones (I) are readily obtainable with good yields from halogen benzenes and acid chlorides or acid hydrides.

The nitration is carried out either with an excess of at least five to six mols of introduced fuming nitric acid (Process 1) or with a mixture of nitric and sulphuric acids containing at least two to three mols of excess nitric acid (Process 2). The yields increase as the temperature falls; if the nitration is carried out at −10 to −20° C., the yield is 70 to 85% of the theoretical; with increasing temperature, the yield decreases and is for example lower at room temperature. It is advisable to stir strongly during the nitration, especially when using Process 2.

The reduction of the nitro group of the 3-acyl-6-halogeno-nitrobenzenes (II) to the amino group is carried out in mineral acid solution and advantageously a strong hydrochloric acid solution with tin-(II)-chloride.

It is surprising that no halogen is split off when reducing with tin-(II)-chloride; it was to be expected that halogen would split because the halogen atom was in the o-position to the nitro group (see Houben-Weyl, Methoden der organischen Chemie, 4th edition, vol. XI/1, page 422).

The substantially unknown 3-acyl-6-halogen-aniline (III) occurring with a high yield is dissolved in a solvent, advantageously trimethylene or triethylene glycol, and converted with hydrazine or hydrazine hydrate in the presence of excess solid alkali metal or alkaline earth metal hydroxide into 3-alkyl-6-halogeno-anilines (IV). The excess of alkali metal hydroxide or alkaline earth metal hydroxide is preferably 1 to 4 mols, more especially 2 to 3 mols. With a greater or less amount of alkali, the yield is lower, in the latter case on account of polymerisation reactions. The reduction with hydrazine or hydrazine hydrate proceeds with heating in stages. First of all, heating takes place to about 80 to 100° C., then to about 140 to 160° C. and finally to about 170 to 190° C.

With the hydrazine reduction according to the invention, the yield is 70 to 90% of the theoretical.

The reduction of the carbonyl group according to Clemmensen or by catalytic hydrogenation only produced very poor yields or could not be carried out at all.

With the action of hydrazine or hydrazine hydrate on 3-acyl-6-fluoroanilines and 3-acyl-6-chloroanilines, no dehalogenisation occurs at all, while this only occurs to a very slight degree with 3-acyl-6-bromanilines and 3-acyl-6-iodoanilines.

It is also surprising that, using the process of the invention, there is no appreciable lowering of the yield even when R is larger than $CH_3$.

The invention is further illustrated by the following examples, the first three of which illustrate separate stages of the process and the fourth illustrates the complete process.

EXAMPLE 1

3-acyl-6-halogeno-nitrobenzenes

Process 1.—77 parts of 4-chloracetophenone are added to 200 to 300 parts of fuming nitric acid, cooled to −10 to −20°, in about 30 minutes. The mixture is then stirred for another 30 to 60 minutes at the same temperature cooled to −30° and the reaction mixture is slowly poured on to finely crushed ice. After this ice melts, the crystalline 3-nitro-4-chloracetophenone is suction-filtered, washed several times on the suction filter with water, dried and if necessary recrystallised from methanol. M.P.=98 to 100° C., yield 80 to 85% of the theoretical.

In similar manner, the following are obtained with yields of 70 to 85% of the theoretical:

(1) 3-nitro-4-fluoracetophenone, M.P.= 49 to 50° C.
(2) 3-nitro-4-chloropropiophenone, M.P.=59 to 60° C.
(3) 3-nitro-4-chlorobutyrophenone, M.P.=53° C.
(4) 3 - nitro - 4 - chlorisobutyrophenone, M.P.=53 to 54° C.
(5) 3-nitro-4-bromacetophenone, M.P.=118 to 120° C.
(6) 3-nitro-4-bromobutyrophenone, M.P.=73 to 74° C.
(7) 3-nitro-4-iodoacetophenone, M.P.=112 to 114° C.

The compounds 2, 4 and 6 are unknown and were analysed.

*Process 2.*—69 parts of 4-fluoracetophenone are introduced while stirring into 500 parts of concentrated sulphuric acid, cooled to −10 to −15° C. A nitrating acid mixture, consisting of 126 parts of fuming nitric acid and 300 parts of fuming sulphuric acid (containing 20% $SO_3$) and cooled to 0° C. is added dropwise in 30 to 40 minutes while stirring at high speed (800 to 1000 r.p.m.) and care is taken that the temperature in the reaction mixture is kept as constant as possible at −10° C. After completing the dropwise addition, stirring is continued for another 45 minutes at −10° C., whereupon the mixture is cooled to −30° C. and slowly poured on to ice. The further working up is in accordance with that indicated in Process 1 and yields 75% of the theoretical of 3-nitro-4-fluoracetophenone, M.P.=49 to 50° C.

The aforementioned 3 - nitro - 4-halogenophenyl-alkyl ketones can be recovered in similar manner.

EXAMPLE 2

3-acyl-6-halogeno-anilines 29 parts of 3-acetyl-6-iodonitrobenzene, 68 parts of tin-(II)-chlorine (dihydrate) and 110 parts of fuming hydrochloric acid are slowly stirred while cooling with water. The reduction of the nitro group takes place in a short time with considerable heat of reaction. After cooling to room temperature, 100 parts of toluene are added and the mixture made alkaline while stirring and cooling with 30% sodium hydroxide solution. The toluene layer is separated from the aqueous phase, the latter is subsequently esterified, and the ethereal extract is combined with the toluene layer. The toluene-ether layer is shaken once with saturated sodium chloride solution and dried over potash. The solvents are distilled off; 3-acetyl-6-iodoaniline remains as residue with a yield of 80%. M.P.=136 to 138°, from benzene.

In similar manner, there are obtained with yields of 80 to 90% other 3-acyl-6-halogeno-anilines, which in most cases can be subjected to the reduction with hydrazine without any additional purification, for example by recrystallization or distillation.

(1) 3-acetyl-6-fluoroaniline, M.P.=70 to 72° C.
(2) 3-acetyl-6-chloroaniline, M.P.=104 to 105° C.
(3) 3-propionyl-6-chloroaniline, M.P.=92 to 93° C.
(4) 3-butyryl-6-chloroaniline, M.P.=95 to 96° C.
(5) 3 - isobutyryl - 6 - chloroaniline, colourless oil with a B.P. 173 to 175° (3.5 mm. Hg); acetamide, M.P =104 to 106° C.
(6) 3-acetyl-6-bromoaniline, M.P.=116° C.
(7) 3-butyryl-6-bromoaniline, M.P.=103 to 105° C.

3-acetyl-6-iodoaniline and the compounds 1, 3 5 and 7 were formerly unknown and were analysed.

EXAMPLE 3

3-alkyl-6-halogeno-anilines 8.5 parts of 3-acetyl-6-chloroaniline are dissolved in 50 parts of triethylene glycol or trimethylene glycol, 5.6 to 8.4 parts of solid potassium hydroxide and 4.8 parts of hydrazine or 6 parts of hydrazine hydrate are added and the mixture is heated for 1 hour to 100° C. The mixture is then heated for 1 hour to 150° C., the excess hydrazine and the water in the reaction mixture being distilled off. Any entrained 3-ethyl-6-chloroaniline is recovered by extraction with ether. After heating for another hour to 180° C., the mixture is allowed to cool, 50 to 100 parts of water are added and extraction with ether is carried out. The 3-ethyl-6-chloroaniline is extracted from the ethereal layer with hydrochloric acid. By making the hydrochloric acid solution alkaline, extracting with ether and fractional distillation, a 90% yield of 3-ethyl-6-chloroaniline is obtained with a B.P.$_{15}$ −124 to 127° C., Picrate M.P.=127 to 128° C.

In a similar manner, the following 3-alkyl-6-halogeno-anilines are obtained with yields of 70 to 90%:

(1) 3-ethyl-6-fluoroaniline, B. P.$_{15}$ 97 to 100° C. picrate M.P.=138–139°
(2) 3-propyl-6-chloroaniline, B.P.$_{15}$ 138 to 140° C. picrate M.P.=108–110°
(3) 3-butyl-6-chloroaniline, B.P.$_{15}$ 148 to 150° C. picrate M.P.=89–90°
(4) 3-ethyl-6-bromoaniline, B.P.$_{16}$ 140 to 142° C. picrate M.P.=118–119°
(5) 3-butyl-6-bromoaniline, B.P.$_{12}$ 156 to 160° C. acetamide M.P.=97–98°
(6) 3-ethyl-6-iodoaniline, B.P.$_{1.5}$ 135 to 140° C. picrate M.P.=156–158°

EXAMPLE 4

3-butyl-6-chloroaniline from 4-chlorobutyrophenone 5 parts of 4-chlorobutyrophenone are added over a period of about 30 minutes to 250 parts of fuming nitric acid, cooled to −15° C. After stirring for 60 minutes at −15° C., the mixture is cooled to −30° C. and the reaction mixture is slowly poured on to finely crushed ice. After melting the ice, the crystalline 3-nitro-4-chlorobutyrophenone is suction-filtered, washed on the filter several times with water, dried and recrystallized from methanol. M.P.=52 to 53° C., yield 90% of the theoretical.

23 parts of 3-nitro-4-chlorobutyrophenone, 68 parts of stannous chloride (dihydrate) and 110 parts of fuming hydrochloric acid are slowly stirred while cooling with water. The reduction of the nitro group is quickly initiated and is combined with considerable heat of reaction. After cooling to room temperature, 100 parts of toluene are added and the mixture is made alkaline with 30% sodium hydroxide solution while stirring and cooling. The toluene layer is separated from the aqueous phase, the latter is subsequently etherified and the ethereal extract is combined with the toluene layer. The toluene-ether layer is washed with saturated sodium chloride solution and dried over potash. After distilling off the solvents, 3-butyryl-6-chloroaniline remains with a yield of 80%, M.P.=95 to 96° C., from benzene/petroleum ether.

20 parts of 3-butyryl-6-chloroaniline are dissolved in 50 parts of triethylene glycol, 11 parts of solid potassium hydroxide and 12 parts of hydrazinehydrate are added and the mixture is heated for 1 hour to 100° C. This is thereafter heated for 1 hour to 150° C. and the excess hydrazine and the water in the reaction mixture are allowed to distill off by way of an attachment. Entrained 3-butyl-6-chloroaniline is recovered by extraction with ether. The reaction mixture is thereafter heated for anothetr hour to 180°, allowed to cool, 100 parts of water are added and it is then extracted with ether. The 3-butyl-6-chloroaniline is extracted from the ethereal phase with hydrochloric acid. By making the hydrochloric acid solution alkaline, extracting with ether and fractional distillation, there is obtained a 78% yield of 3-butyl-6-chloroaniline having the B.P.$_{15}$=148 to 150° C. picrate M.P.=89 to 90° C.

What I claim is:

1. A process for the production of 3-lower alkyl-6-halogeno-anilines according to the reaction scheme

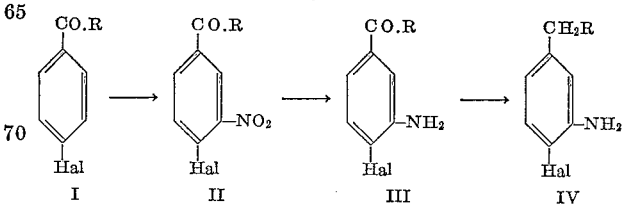

wherein R stands for a lower alkyl groups with from 1 to 3 carbon atoms, Hal stands for a halogen atom selected from the group consisting of F, Cl, Br and I, which comprises nitrating at a temperature below —10° C. a 4-halogenophenyl-lower alkyl ketone with a nitrating agent selected from the group consisting of an excess of at least 5 to 6 moles of fuming nitric acid and a nitric acid-sulfuric acid-mixture of at least 2 to 3 mols excess of nitric acid, to form a 3-lower acyl-6-halogeno-nitrobenzene, reducing the latter in mineral acid with stannous chloride to form the corresponding 3-lower-acyl-6-halogeno-aniline, dissolving the latter in a solvent and converting the —COR group into the corresponding —$CH_2R$ group by means of an agent selected from the group consisting of hydrazine and hydrazinhydrate in the presence of an alkali selected from the group consisting of alkali metal hydroxides and alkaline earth metal hydroxides by heating in stages to about 80–100° C., subsequently to 140–160° C. and finally to 170–190° C. and separating the resulting 3-lower alkyl-6-halogeno-aniline.

2. A process as claimed in claim 1, which comprises carrying out the nitration of 4-halogenophenyl-lower alkyl ketone to the corresponding 3-lower acyl-6-halogenonitrobenzene at a temperature from —10° C. to —30° C.

3. A process as claimed in claim 1, which comprises reducing a 3-lower acyl-6-halogeno-aniline to the corresponding 3-lower alkyl-6-halogeno-aniline by converting the —COR group to the corresponding —$CH_2R$ group in the presence of 2 to 3 mols of alkali metal hydroxide per mol of ketone.

4. A process for the production of 3-lower alkyl-6-halogeno-aniline, as claimed in claim 1, which comprises reducing a 3-lower acyl-6-halogeno-nitrobenzene in mineral acid with stannous chloride to form the corresponding 3-lower acyl-6-halogeno-aniline, dissolving the aniline derivative in a solvent and converting the —COR group to a $CH_2R$ group by reaction with an agent selected from the group consisting of hydrazine and hydrazine hydrate in the presence of an alkali selected from the group consisting of alkali metal hydroxides and alkaline earth metal hydroxides by heating in stages to about 80 to about 100° C., then to about 140 to about 160° C., and finally to about 170 to about 190° C. and separating the 3-lower alkyl-6-halogeno-aniline so produced.

5. A process as claimed in claim 1, in which the reduction of a 3-lower acyl-6-halogeno-nitrobenzene to the corresponding 3-lower acyl-6-halogeno-aniline is carried out in fuming hydrochloric acid with stannous chloride.

References Cited by the Examiner
UNITED STATES PATENTS 2,561,190   7/1951   Firestine _____ 260—580

OTHER REFERENCES

Fieser et al.: Organic Chemistry, 3rd edition, 1956, page 214.

CHARLES B. PARKER, *Primary Examiner.*